United States Patent [19]

Dammeyer

[11] 4,276,622

[45] Jun. 30, 1981

[54] ULTRASONIC DISTANCE MEASURING CIRCUIT

[75] Inventor: Ned E. Dammeyer, New Bremen, Ohio

[73] Assignee: Crown Controls Corporation, New Bremen, Ohio

[21] Appl. No.: 57,921

[22] Filed: Jul. 16, 1979

[51] Int. Cl.³ ............................................. G01S 11/00
[52] U.S. Cl. .................................... 367/118; 367/97; 367/117; 367/127
[58] Field of Search ................. 367/97, 118, 127, 108, 367/114, 117

[56] References Cited

U.S. PATENT DOCUMENTS

| | | | |
|---|---|---|---|
| 3,123,797 | 3/1964 | Ehrman | 367/97 |
| 3,344,421 | 9/1967 | Dildy, Jr. | 367/97 |
| 3,360,769 | 12/1967 | Lord | 367/137 |
| 3,554,013 | 1/1971 | Berg | 73/67.7 |
| 3,757,285 | 9/1973 | Ferré | 367/108 |
| 3,792,613 | 2/1974 | Couture | 73/67.9 |
| 3,808,879 | 5/1974 | Rogers | 73/67.9 |
| 3,824,464 | 7/1974 | Rotier et al. | 367/127 |
| 3,929,006 | 12/1975 | Boggs et al. | 73/67.8 S |
| 4,014,208 | 3/1977 | Moore et al. | 73/67.9 |
| 4,026,654 | 5/1977 | Beaurain | 367/108 |

*Primary Examiner*—Richard A. Farley
*Attorney, Agent, or Firm*—Biebel, French & Nauman

[57] ABSTRACT

An output distance signal related to the distance between an ultrasonic transmitting transducer and an ultrasonic receiving transducer is provided by an apparatus including a reference oscillator and a burst generator responsive to the reference oscillator which periodically generates ultrasonic burst signals. The ultrasonic transmitting transducer is responsive to the generator for providing an ultrasonic acoustic energy burst in response to each of the ultrasonic burst signals. An ultrasonic receiving transducer receives the ultrasonic acoustic energy bursts and generates detection signals in response thereto. A range window circuit is responsive to detection of an acoustic energy burst by the receiving transducer, for providing a range window signal at a time period lagging the detection signal such that a range gate will be opened for passage of the next following detection signal. A converter is responsive to the range gate and to the burst signals for providing an output distance signal, related in potential to the distance between the transmitting and receiving transducers.

6 Claims, 5 Drawing Figures

ULTRASONIC DISTANCE MEASURING CIRCUIT

BACKGROUND OF THE INVENTION

The present invention relates generally to ultrasonic distance measuring apparatus of the type which provides a distance output signal related to the time required for an ultrasonic wave to travel from a transmitter to a receiver and, more particularly, to such distance measuring apparatus in which reliability is enhanced and the possibility of erroneous distance measurement is reduced.

Various circuit arrangements have been utilized in the past to determine the distance between a transmitter and a receiver of ultrasonic acoustic wave energy. If the speed of sound in the medium through which the ultrasonic acoustic wave passes is known, the time period required for an acoustic wave to travel between the transmitter and receiver is proportional to the distance therebetween. Such a system has been utilized in numerous applications including, for example, measurement of the length or thickness of a pipe or other metallic element. In many such systems, the transmitter and receiver are positioned adjacent each other with the transmitted ultrasonic wave passing through the material and being reflected from the opposite surface of the material. In such an arrangement the transit time for the ultrasonic wave energy is twice the thickness or length of the material being measured.

One prior art device for measuring the time differential between transmitted and received ultrasonic acoustic energy waves is shown in U.S. Pat. No. 3,792,613, issued Feb. 19, 1974, to Couture. The Couture circuit provides for analog display of the transmitted and received ultrasonic pulses, with the time period between successive pulses being determined by their spacing on the CRT display.

As may be appreciated, any such ultrasonic distance measuring arrangement is subject to extraneous electrical noise. Additionally, if the system is operated in an acoustically noisy environment, such as a manufacturing plant, equipment in the plant may occasionally generate ultrasonic acoustic energy of a frequency detectable by the ultrasonic receiving transducer, resulting in the possibility that an inaccurate distance may be made. In order to reduce the occurrence of measurement errors, a number of prior art ultrasonic distance measuring circuits have utilized a range gate in the receiver circuitry which is enabled to pass a detection signal only at the estimated time of arrival of the received ultrasonic acoustic energy. U.S. Pat. No. 3,808,879, issued May 7, 1974, to Rogers; U.S. Pat. No. 4,014,208, issued Mar. 29, 1977, to Moore et al; and U.S. Pat. No. 3,929,006, issued Dec. 30, 1975, to Boggs et al, all show such ranging circuitry. In each of these circuits, a timer begins timing when an ultrasonic acoustic pulse is transmitted and opens a range gate at the approximate time subsequent to transmission at which it is expected to receive the transmitted ultrasonic acoustic pulse.

U.S. Pat. No. 3,554,013, issued Jan. 12, 1971, to Berg, shows a pulse-echo ultrasonic thickness measuring arrangement in which a range gate is opened at a fixed time subsequent to the transmission of the ultrasonic acoustic pulse. This time period is selected such that it corresponds to the time required for the pulse to traverse part of the transmitter structure, prior to entering the test material. Simultaneously with the opening of the range gate, a flip flop is set, initiating operation of a ramp generator. A pulse receiver detects reflection of the transmitted ultrasonic acoustic pulse and resets the flip flop via the range gate, thus terminating operation of the ramp generator. A peak detector circuit is provided for detecting the voltage level reached by the ramp output signal of the ramp generator, thus providing an analog indication of the time period between transmission and receipt of the ultrasonic wave energy.

All of the above range gating circuits provide for enablement of the range gate at a predetermined time period following transmission of a pulse of a ultrasonic energy. While this technique is acceptable when a distance of generally known magnitude is being measured, such an approach is not viable where the distance is unknown or where the distance may vary widely during operation of the system.

An additional problem exists with distance measuring apparatus of the type discussed above in which a sample and hold output circuit is provided with the output being updated during each transmit and receive operation. If, for some reason, the receiving transducer malfunctions, or the transmitting transducer ceases operation, the output will not be updated. If the measured distance thereafter changes, the output provided by the circuit then will not correspond to the altered distance. It is desirable, therefore, that the distance measuring circuit include an error detection arrangement for detecting malfunction in the operation of the system and providing an error indication output signal when such a malfunction occurs.

SUMMARY OF THE INVENTION

An ultrasonic distance measuring circuit provides an output distance signal related to the distance between an ultrasonic transmitting transducer and an ultrasonic receiving transducer. A reference oscillator means provides a reference oscillator signal to a burst generator means which periodically generates ultrasonic burst signals. An ultrasonic transmitting transducer means is responsive to the burst generator means for providing an ultrasonic acoustic energy burst in response to each of the ultrasonic burst signals. An ultrasonic receiving transducer means receives each ultrasonic acoustic energy burst and provides a detection signal in response thereto. A range window means is responsive to the receiving transducer means and the oscillator means for providing a range window signal lagging the detection signal by a predetermined time period. A range gate means is responsive to the range window signal and to the detection signal for providing an output gate signal upon occurrence of the detection signal coincident with the range window signal. A converter means, responsive to the ultrasonic burst signal and to the output gate signal, provides an output distance signal related to the distance between the transmitting and receiving transducer means. The predetermined time period may be set to be substantially equal to the time between successive detection signals, since such successive detection signals occur at substantially the same rate as successive ultrasonic burst signals.

The range window means may comprise a counter means which is responsive to the detection signal and to the oscillator signal for resetting upon occurrence of a detection signal and providing the range window signal after reaching a predetermined count state in response to the oscillator signal.

The converter means may comprise a ramp generator means for providing a linear time varying time ramp signal in response to the occurrence of a burst signal. A sample and hold circuit means is responsive to the ramp generator means and to the range gate means for sampling the ramp signal upon receipt of the output gate signal and providing an output distance signal related in potential to the potential of the ramp signal at the instant of sampling.

The burst generator means may comprise a counter means which is responsive to the reference oscillator signal and which provides repetitively a burst period output signal. The burst generator means further comprise a burst generator gate means which is responsive to the reference oscillator signal and to the burst period output signal for repetitively providing the ultrasonic burst signal to the ultrasonic transmitting transducer.

A pulse monitor means monitors the output of the range gate means and provides a missing pulse signal output upon failure of a detection signal to occur within a predetermined period of time.

Accordingly, it is an object of the present invention to provide ultrasonic distance measuring apparatus in which an ultrasonic acoustic energy burst results in a distance measurement indication only when such burst is received during a range window time period; to provide such a circuit in which the range window time period occurs at a predetermined time after receipt of an ultrasonic acoustic energy burst by the receiving transducer; to provide such a circuit in which failure to receive such a burst for a predetermined period of time results in generation of an error indication; and to provide such a circuit in which successive range window time periods occur at a rate corresponding to the repetition rate of the generation of ultrasonic acoustic energy bursts.

DETAILED DESCRIPTION OF THE PREFERRED EMBODIMENT

Figure 1:
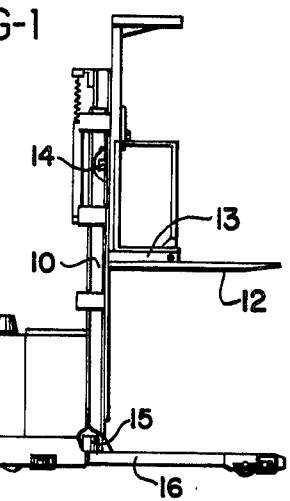
FIG. 1 is a side view of a conventional fork lift truck including apparatus according to the present invention to measure the height to which the forks are raised.

The present invention relates to ultrasonic distance measuring apparatus and, more particularly, to an arrangement for providing accurate, reliable measurement of the distance between an ultrasonic transmitting transducer and an ultrasonic receiving transducer. FIG. 1 illustrates a fork lift truck of conventional design in which the distance measuring apparatus of the present invention may find particular application. The fork lift truck includes an extendable fork lift mast 10 upon which a pair of forks 12 and an operator support platform 13 are mounted. By operation of truck controls, the operator may raise or lower the forks 12 and platform 13. Although a stockpicker type truck is illustrated, it will be appreciated that the ultrasonic distance measuring apparatus of the present invention may also find application on fork lift trucks of the type in which only the forks are raised and lowered.

It is desirable to provide an electrical indication of fork lift fork height so that the operator will not drive the truck at too high a rate of speed with the forks raised. If desired, this electrical indication of lift fork height could be utilized as an input to an automatic speed control for limiting the maximum truck speed in dependence upon the height of the forks. Such a speed control circuit is shown, for instance, in copending U.S. application, Ser. No. 57,771 filed on even date herewith and assigned to the assignee of the present invention. Additionally in a truck of the type in which the operator remains at ground level, it may be desirable to be able to provide an indication to the operator of the height to which the forks are raised. The operator may wish to insert the forks beneath a skid or container resting on the second or third level of a container storage rack. In such an instance, the operator knows the height of the container and therefore knows the height to which the forks 12 must be raised. Previously, the operator was required to estimate the appropriate fork height and then make adjustments in the height of the forks as they are moved into position beneath the container. This requires a substantial degree of skill.

In order to provide such an electrical indication of fork height, an ultrasonic distance measuring apparatus in accordance with the present invention is mounted on the fork lift truck. The electrical indication may be provided to a visual indicator, such as a voltmeter calibrated in feet, for viewing by the operator or provided to a speed control circuit, or both. As shown in FIG. 1, an ultrasonic transmitting transducer 14 is mounted on the platform 13 and is raised and lowered along with the forks 12 and platform 13. The transducer, when appropriately energized, projects downward an acoustic energy burst which is received by a receiving transducer device 15 mounted on the truck body 16 below the transmitting transducer device 14. The receiving transducer device 15, shown generally in FIG. 2, receives the acoustic energy burst and converts this burst into an electrical signal. As is clear, the time required for the acoustic energy burst to travel from the transmitting transducer device 14 to the receiving transducer device 15 is directly related to the height to which the forks 12 are raised.

Figure 2:
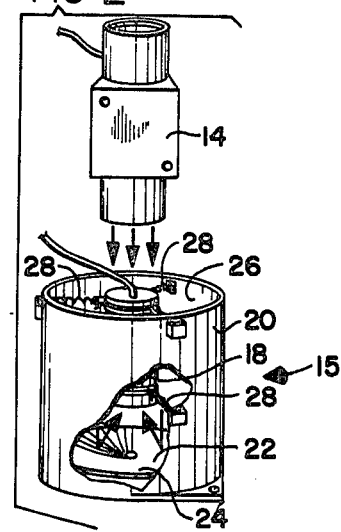
FIG. 2 illustrates the construction of an ultrasonic transmitter and an ultrasonic receiver which may be used in the present invention.

The construction of the transmitting and receiving transducer devices 14 and 15, respectively, is illustrated in FIG. 2. The construction of these devices is disclosed more fully in copending patent application, Ser. No. 57,772 filed on even date herewith. Generally, the receiving transducer device 15 includes a downward facing transducer 18 which is mounted centrally within a transducer casing 20. A parabolic reflector 22 is positioned in the bottom of the casing 20 such that the downward projected acoustic energy bursts are reflected by reflector 22 upward and focused onto the receiving transducer 18. By providing for downward facing transmitting and receiving transducers, the possibility of dirt or other foreign material accumulating on the transducer surfaces and impairing transducer operation is eliminated. The parabolic reflector 22 defines a central hole 24 which permits dust and other material falling into the casing 20 to drop through the casing.

The receiving transducer 18 is positioned generally centrally in the casing cavity 26 by means of springs 28 which extend radially outward from the transducer 18 and provide for mounting of the transducer 18 mechanical isolation of the transducer from the casing 20 and the truck body to which casing 20 is attached. It will be understood that other ultrasonic transmitting and receiving transducer arrangements may be utilized with the distance measuring apparatus of the present invention, and that the transducer arrangement shown in FIGS. 1 and 2 are presented for illustrative purposes only.

Figure 3:
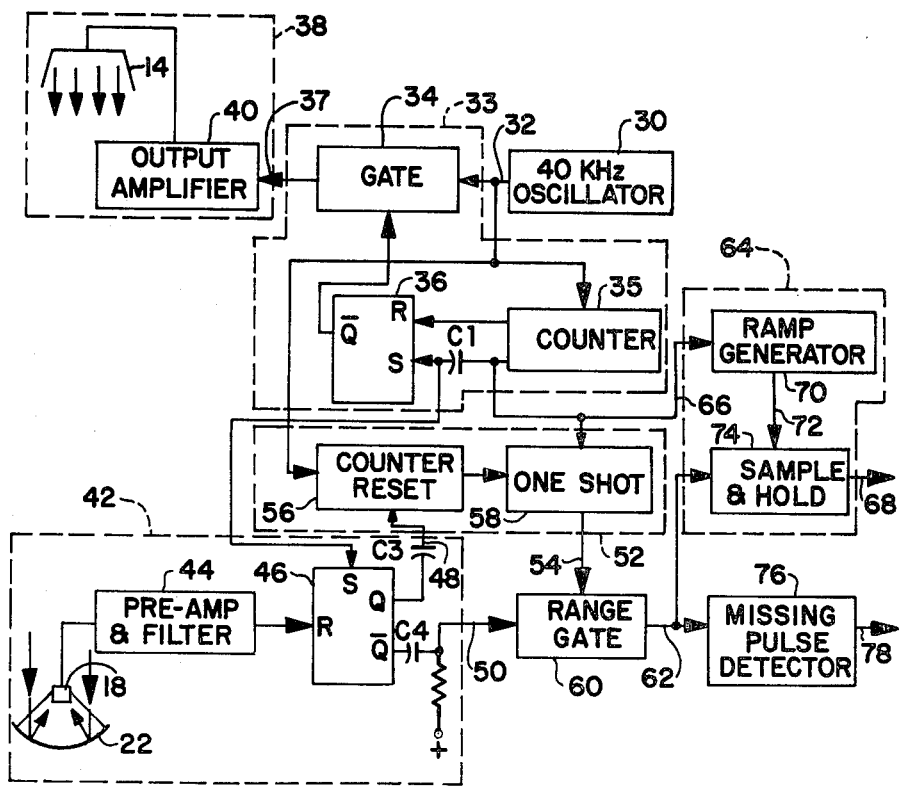
FIG. 3 is a block diagram illustrating the ultrasonic distance measuring apparatus of the present invention.

Reference is now made to FIG. 3 which is a block diagram illustrating the ultrasonic distance measuring apparatus of the present invention. A reference oscillator means comprises an oscillator 30 which provides a reference oscillator signal on line 32 at approximately 40 KHz. A burst generator means 33, including gate 34, counter 35, and flip flop 36, is responsive to the reference oscillator 30 for periodically generating ultrasonic burst signals on line 37. Ultrasonic burst signals on line 37 may comprise 40 KHz bursts, each lasting for approximately 1.6 milliseconds and occurring at the rate of 20 bursts per second. An ultrasonic transmitting transducer means 38, including transmitting transducer 14, and an output amplifier 40, is responsive to the burst generator means 33 for providing an ultrasonic acoustic energy burst in response to each of the ultrasonic burst signals.

An ultrasonic receiving transducer means 42, including transducer 18, reflector 22, preamplifier and filter 44, and flip flop 46, receives the ultrasonic acoustic energy bursts generated by the transmitting transducer 14 and provides detection signals on lines 48 and 50 in response thereto. A range window means 52 is responsive to the receiving transducer means 42 and to the oscillator means 30 for providing a range window signal on line 54 at a time lagging each detection signal by a predetermined time period. The range window means includes a counter 56 and a monostable multivibrator 58.

A range gate means 60 is responsive to the range window signal on line 54 and to the detection signal on line 50 for providing output gate signals on line 62 upon occurrence of a detection signal coincident with a range window signal. A converter means 64 is responsive to a signal on line 66 indicating the generation of an ultrasonic burst signal by burst generator means 33. The converter means 64 is further responsive to the output gate signal on line 62 for providing an output distance signal on line 68 which is related in potential to the distance between the transmitting and receiving transducer means. Converter means 64 includes a ramp generator means 70 which provides a linear time varying ramp signal on line 72 in response to the occurrence of a burst signal. The sample and hold circuit 74 is responsive to the ramp signal on line 72 and to the range gate 60 for sampling the ramp signal upon receipt of the output gate signal on line 62, thus providing an output distance signal equal in potential to the ramp signal at the instant of sampling.

A pulse monitor means, including missing pulse detector circuit 76, monitors the output of the range gate means 60 and provides a missing pulse signal output on line 78 upon failure of a detection signal to occur within a predetermined period of time.

Figure 4:
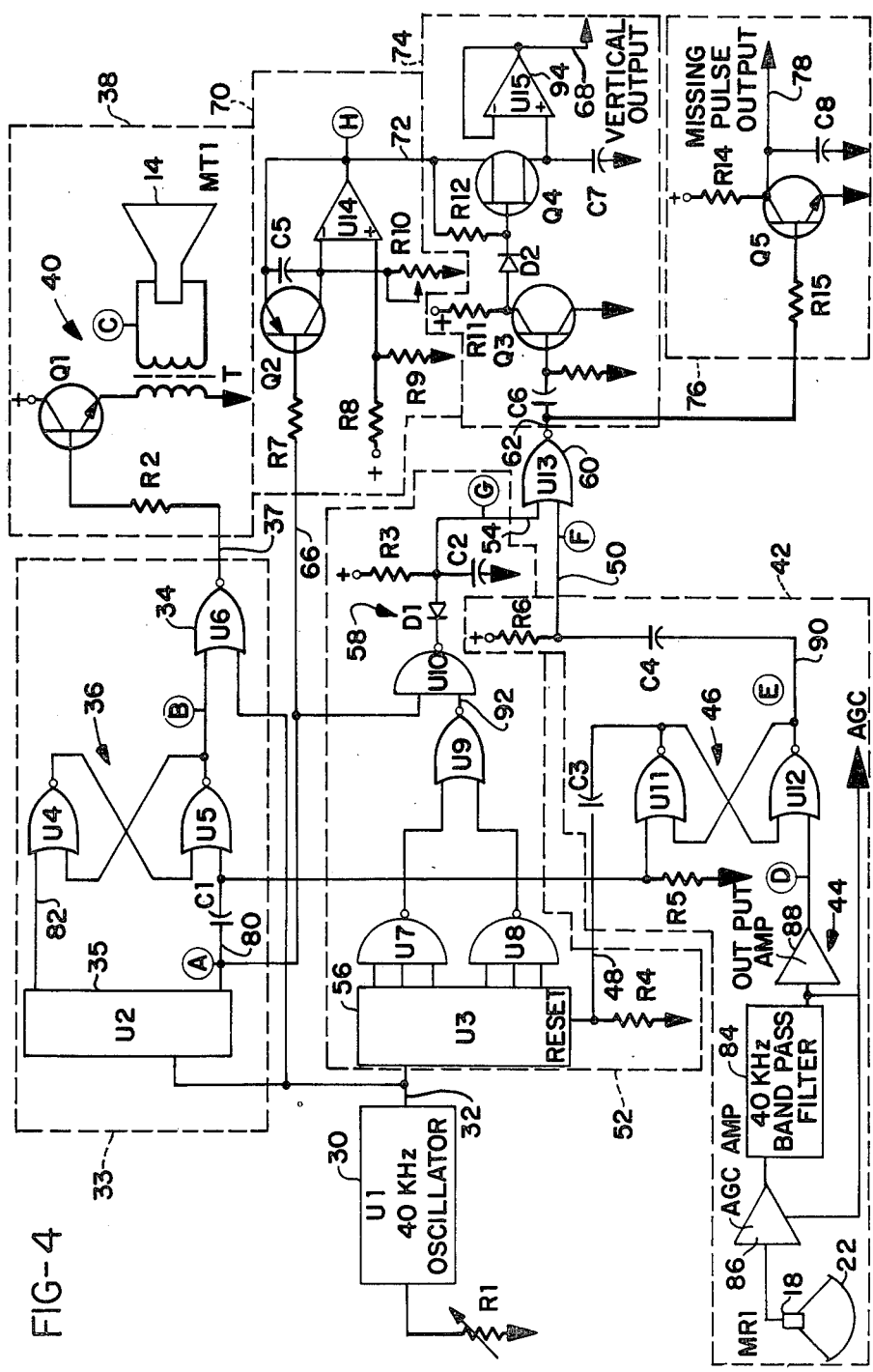
FIG. 4 is a schematic diagram illustrating the apparatus of the present invention in greater detail.
Figure 5:
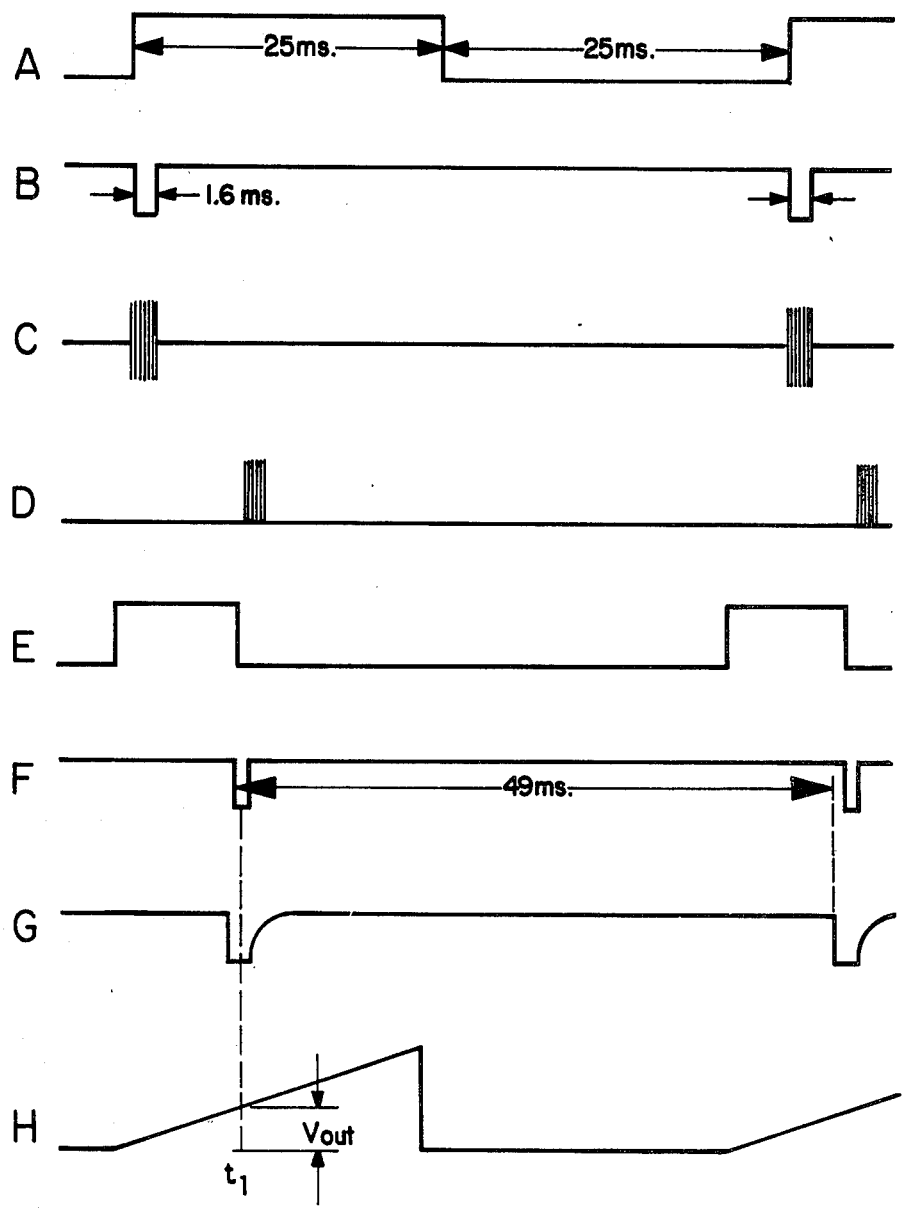
FIG. 5 is a signal diagram illustrating the signal levels at various points in the circuit of FIG. 4 during operation of the circuit.

Reference is now made to the circuit diagram of FIG. 4 and the signal diagram of FIG. 5 in which circuit operation is illustrated. The encircled letters A–H in the schematic diagram of FIG. 4 refer to the signals illustrated in FIG. 5.

Reference oscillator 30 includes a 40 KHz oscillator which, if desirable, may be adjusted in frequency by means of resistor R1. The 40 KHz oscillator output is supplied to burst generator 33 which includes a counter 35. Counter 35 has two outputs which are supplied to cross-coupled NOR gates U4 and U5 which together form the flip flop 36. The counter 35 is a binary counter which divides down the 40 KHz signal on line 32 by factor of 2048 to generate a 20 Hz output signal A on line 80 which alternately goes high and low every 25 milliseconds. Counter 35 provides a divided down signal on line 82 at 1/64th of the frequency of the oscillator signal. Thus, an output is provided on line 82 1.6 milliseconds after the output on line 80. Capacitor C1 differentiates the 25-millisecond pulse and applies a positive going spike to the input of gate U5 which sets the flip flop 36, thus causing the B output to go low. At a time 1.6 milliseconds later, the flip flop 36 is reset, thus returning the output B to a high state. As will be appreciated, gate 34 is enabled only during the 1.6-millisecond intervals when the B signal goes low and these intervals occur at the rate of 20 times per second. Gate 34, when enabled, passes the 40 KHz oscillator signal from oscillator 30 to line 37. The signal on line 37 is amplified by amplifier 40 including transistor Q1 and transformer T and supplied as signal C to the transmitting ultrasonic transducer 14.

Transmitting transducer 14 produces a burst of acoustic energy which is received by receiving transducer means 42 which includes the transducer 18 and reflector 22. Ultrasonic receiving transducer means 42 includes a 40 KHz bandpass filter 84, as well as a gain control amplifier 86 and an output amplifier 88. The signal D resets the flip flop 46, which was previously set at the time the burst generator means enabled gate 34. Resetting flip flop 46 provides a detection signal pulse on line 48 via capacitor C3, resetting counter 56 of range window means 52 to a zero count state. Simultaneously, the signal E on output 90 is differentiated by capacitor C4 to produce a detection signal F in the form of a negative going spike on line 50. This detection signal is supplied to the range gate 60 which passes the detection signal only if it occurs during a range window time period.

As illustrated in FIG. 5, the range window signal G is generated approximately 49 milliseconds after occurrence of the previously received detection signal. Since the detection signals occur successively at the same rate at which successive ultrasonic burst signals are generated, successive detection signals can be expected to occur approximately every 50 milliseconds, regardless of the distance between the transmitting and receiving transducers and regardless of the time delay between transmission of an ultrasonic acoustic energy burst and receipt of the burst.

This 49-millisecond period is timed by counter 56, which is reset by a pulse on line 48 upon occurrence of a detection signal. Counter 56 then begins counting and provides, through gates U7, U8, and U9, a signal on line 92 which goes high approximately 49 milliseconds subsequent to the previously received ultrasonic acoustic energy burst. Gate U10, diode D1, resistor R3, and capacitor C2 form a monostable multivibrator circuit which, when enabled by a high signal on line 92 and a high output on line 66, provides a low going signal G of fixed duration on line 54. When the inputs of gate U10 both go high, the output of gate U10 is grounded, discharging capacitor C2 through diode D1. A fixed time period is required thereafter for recharging capacitor C2 through resistor R3. Thus, a range window signal having a predetermined fixed range window time period is supplied to range gate 60. Gate 60, upon simultaneous receipt of the detection signal on line 50 and the range window signal on line 54, provides a high going gate output signal on line 62. The output gate signal on line 62 turns on transistor Q3 which, in turn, switches on FET Q4. This permits capacitor C7 to charge to the instantaneous level of a linear time varying ramp signal 8 provided on line 72. Thus, as shown in FIG. 5, occurrence of a detection signal at time $t_1$ results in the capacitor C7 being charged to the instantaneous potential level $V_{out}$ of the ramp signal H. Buffer 94 provides the desired output distance signal which is related to the distance between the transmitting and receiving transducers.

The ramp generator means 70 is enabled by a high going signal on line 66 which occurs at the initiation of an ultrasonic burst signal. This high going signal turns off transistor Q2, permitting capacitor C5 to be charged at a linear rate. The charging rate can be adjusted by adjustment of resistor R10, thus varying the slope of the generated ramp function and changing the voltage-to-distance scale factor. The ramp signal H is sampled once every 50 milliseconds and the output of buffer 94 therefore continues to be representative of the distance between the transducers.

If a noise burst is received prior to a valid received burst, the noise burst will reset flip-flop 46, thereby resetting counter 56. Therefore when the valid burst is received, the range window signal G will not occur coincident with the valid burst signal, thereby preventing the output on line 68 from being updated. Furthermore, with the counter 56 successively receiving bursts, a second noise burst would have to occur 50 milliseconds following the first noise burst to produce an erroneous output. Since noise is of a random nature, the probability of sequentially occurring noise of the required frequency is very small. The second valid burst of ultrasonic acoustic energy would reset flip-flop 46 and counter 56 and begin a new timing cycle. Therefore, a subsequent valid ultrasonic burst would be gated through to update the output on line 68.

Circuit 76 monitors generation of gate output signals on line 62. Should malfunction occur in the system, the capacitor C7 would not have its charge updated as required and the output 68 would remain unchanged, thus providing a false indication of distance, assuming movement of the transmitting transducer. In order to provide an indication of such a malfunction, transistor Q5 conducts on each output gate pulse and maintains capacitor C8 in a discharged state. Should 10 or more successive gate pulses be missed, indicating a malfunction of approximately one-half second, capacitor C8 is charged through resistor R14 to a potential substantially equal to the positive d.c. reference, indicating that an error has occurred in the system.

As indicated previously, when the apparatus is used on a fork lift truck, the signal on line 68 may be provided to an analog or digital display for visual display to the truck operator. Additionally, such a signal may be utilized in a speed control circuit where it is desired to limit the speed of movement of the truck with the fork raised.

While the forms of apparatus herein described constitute preferred embodiments of the invention, it is to be understood that the invention is not limited to these precise forms of apparatus, and that changes may be made therein without departing from the scope of the invention.

What is claimed is:

1. Ultrasonic distance measuring apparatus for providing an output distance signal related to the distance between an ultrasonic transmitting transducer and an ultrasonic receiving transducer, comprising:
   a reference oscillator means for providing a reference oscillator signal,
   burst generator means, responsive to said reference oscillator means, for periodically generating ultrasonic burst signals,
   an ultrasonic transmitting transducer means, responsive to said burst generator means, for providing an ultrasonic acoustic energy burst in response to each of said ultrasonic burst signals,
   ultrasonic receiving transducer means for receiving said ultrasonic acoustic energy bursts and providing detection signals in response thereto,
   range window means, responsive to said receiving transducer means and said oscillator means, for providing a range window signal at a time lagging each detection signal by a predetermined time period,
   range gate means, responsive to said range window signal and to said detection signals, for providing output gate signals upon occurrence of said detection signal coincident with said range window signal, and
   converter means, responsive to said ultrasonic burst signals and to said output gate signals, for providing an output distance signal related in potential to the distance between said transmitting and receiving transducer means.

2. The apparatus of claim 1 in which said predetermined time period is substantially equal to the time between successive detection signals.

3. The apparatus of claim 1 in which said range window means comprises counter means, responsive to said detection signal and to said oscillator signal, for resetting upon occurrence of a detection signal and providing said range window signal after reaching a predetermined count state in response to said oscillator signal.

4. The apparatus of claim 1 in which said converter means comprises
   ramp generator means for providing a linear time varying ramp signal in response to the occurrence of said burst signal, and
   sample and hold circuit means, responsive to said ramp generator means and to said range gate means, for sampling said ramp signal upon receipt of said output gate signal and providing an output distance signal related in potential to the potential of said ramp signal at the instant of sampling.

5. The apparatus of claim 1 further comprising:
   pulse monitor means for monitoring the output of said range gate means and providing a missing pulse signal output upon failure of a detection signal to occur within a predetermined period of time.

6. The apparatus of claim 1 in which said burst generator means comprises:
   counter means, responsive to said reference oscillator signal, for repetitively providing a burst period output signal, and
   burst generator gate means, responsive to said reference oscillator signal and to said burst period output signal for repetitively providing said ultrasonic burst signals to said ultrasonic transmitting transducer means.

* * * * *